US010420322B2

(12) United States Patent
Jones et al.

(10) Patent No.: US 10,420,322 B2
(45) Date of Patent: Sep. 24, 2019

(54) APPARATUS AND METHOD FOR PROVIDING AERIAL ANIMAL FOOD DELIVERY (71) Applicant: Walmart Apollo, LLC, Bentonville, AR (US)

(72) Inventors: Nathan G. Jones, Bentonville, AR (US); Donald R. High, Noel, MO (US)

(73) Assignee: Walmart Apollo, LLC, Bentonville, AR (US)

(*) Notice: Subject to any disclaimer, the term of this patent is extended or adjusted under 35 U.S.C. 154(b) by 186 days.

(21) Appl. No.: 15/474,986

(22) Filed: Mar. 30, 2017

(65) Prior Publication Data
US 2017/0280678 A1  Oct. 5, 2017

Related U.S. Application Data (60) Provisional application No. 62/316,317, filed on Mar. 31, 2016.

(51) Int. Cl.
A01K 5/02 (2006.01)
B64D 1/12 (2006.01)
(Continued)

(52) U.S. Cl.
CPC .......... A01K 5/0291 (2013.01); B64C 39/024 (2013.01); B64D 1/12 (2013.01);
(Continued)

(58) Field of Classification Search
CPC .......... A01K 5/0291; B64D 1/22; B64D 1/12; B64D 47/08; B64C 39/024; B64C 2201/128; B64C 2201/127
See application file for complete search history.

(56) References Cited

U.S. PATENT DOCUMENTS 9,265,187 B2 * 2/2016 Cavender-Bares ...... A01C 7/00
9,346,547 B2 * 5/2016 Patrick .................. B64C 39/024
(Continued)

FOREIGN PATENT DOCUMENTS

CN 204415731 6/2015
CN 105314112 2/2016
(Continued)

OTHER PUBLICATIONS

Hoogtezicht; "Drone beer delivery", http://hoogtezicht.nl/gallery/52-how-do-they-do-delivery-beer-with-drone, published Feb. 15, 2014, pp. 1-8.
(Continued)

Primary Examiner — Jelani A Smith
Assistant Examiner — Majdi Alsomiri
(74) Attorney, Agent, or Firm — Fitch, Even, Tabin & Flannery LLP (57) ABSTRACT Systems, apparatuses, and methods are provided herein for providing aerial animal food delivery. In one embodiment, a system for providing aerial animal food delivery comprises: an unmanned aerial vehicle, an animal food container coupled to the unmanned aerial vehicle, the animal food container being configured to hold animal food during transport by the unmanned aerial vehicle, and a central computer system communicatively coupled to the unmanned aerial vehicle, the central computer system being configured to: instruct the unmanned aerial vehicle to travel to a service location at a service time with the animal food container and instruct a release of the animal food from the animal food container in an unpackaged form at the service location such that the animal food is accessible to and edible by one or more animals upon release.

17 Claims, 4 Drawing Sheets (51) Int. Cl.
  *B64D 1/22* (2006.01)
  *B64C 39/02* (2006.01)
  *B64D 47/08* (2006.01)

(52) U.S. Cl.
  CPC .............. *B64D 1/22* (2013.01); *B64D 47/08* (2013.01); *B64C 2201/127* (2013.01); *B64C 2201/128* (2013.01)

(56) References Cited

U.S. PATENT DOCUMENTS

| | | |
|---|---|---|
| 9,550,577 B1 | 1/2017 | Beckman |
| 9,573,684 B2 | 2/2017 | Kimchi |
| 2006/0011146 A1 | 1/2006 | Kates |
| 2011/0084162 A1 | 4/2011 | Goossen |
| 2013/0013106 A1 | 1/2013 | Carelli |
| 2014/0032034 A1 | 1/2014 | Raptopoulos |
| 2015/0012163 A1 | 1/2015 | Crawley |
| 2015/0120094 A1 | 4/2015 | Kimchi |
| 2015/0158587 A1 | 6/2015 | Patrick |
| 2015/0158599 A1 | 6/2015 | Sisko |
| 2015/0277440 A1 | 10/2015 | Kimchi |
| 2016/0039529 A1* | 2/2016 | Buchmueller ......... B64D 31/06 244/65 |
| 2016/0196755 A1 | 7/2016 | Navot |
| 2016/0244165 A1* | 8/2016 | Patrick ................. B64C 39/024 |
| 2016/0257401 A1 | 9/2016 | Buchmueller |
| 2016/0259339 A1* | 9/2016 | High ........................ E01H 5/12 |
| 2016/0275801 A1* | 9/2016 | Kopardekar ......... G08G 5/0043 |
| 2017/0110017 A1 | 4/2017 | Kimchi |

FOREIGN PATENT DOCUMENTS

| | | |
|---|---|---|
| WO | 2015022608 | 2/2015 |
| WO | 2016037219 | 3/2016 |

OTHER PUBLICATIONS

Killion, Beth; "Video of the Day May 29, 2015: DIY Drone Delivery", Dronelife, http://dronelife.com/2015/05/29/video-of-the-day-52915-diy-drone-delivery/, May 29, 2015, pp. 1-4.

PCT; App. No. PCT/US2017/023732; International Search Report and Written Opinion dated Jun. 8, 2017.

X, The Moonshot Factory; "Introducing Project Wing", https://www.youtube.com/watch?v=cRTNvWcx9Oo, published on Aug. 28, 2014, pp. 1-5.

* cited by examiner

APPARATUS AND METHOD FOR PROVIDING AERIAL ANIMAL FOOD DELIVERY

CROSS-REFERENCE TO RELATED APPLICATION

This application claims the benefit of the following U.S. Provisional Application No. 62/316,317 filed Mar. 31, 2016, which is incorporated herein by reference in its entirety.

TECHNICAL FIELD

This invention relates generally to unmanned aerial systems.

BACKGROUND

In the United States, over 60% of the households owns pets. Taking care of pets and other domesticated animals often require a lot of time and effort.

BRIEF DESCRIPTION OF THE DRAWINGS

Disclosed herein are embodiments of apparatuses and methods for providing aerial animal food delivery. This description includes drawings, wherein.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein for providing aerial animal food delivery. A system for providing aerial animal food delivery comprises an unmanned aerial vehicle, an animal food container coupled to the unmanned aerial vehicle, the animal food container being configured to hold animal food during transport by the unmanned aerial vehicle, and a central computer system communicatively coupled to the unmanned aerial vehicle, the central computer system being configured to: instruct the unmanned aerial vehicle to travel to a service location at a service time with the animal food container and instruct a release of the animal food from the animal food container in an unpackaged form at the service location such that the animal food is accessible to and edible by one or more animals upon release.

One of the major difficulties of pet ownership is not being able to feed the animals/pets when the owners are away. Owners on a trip also do not have an easy way to check on their property and the well-being of the animals. In some embodiments of the system described herein, an aerial animal food delivery service is provided to allow customers to request pre-scheduled or ad-hoc UAV delivery of animal food to their animals. While a UAV is at the customer premises, the UAV may also be instructed to "loiter" around the property and record a video that can be viewed by the customer.

In some embodiments, a customer may register for the service, select the type of animal they wish to include in the program, and then select a brand/type of animal food for the delivery. In some embodiments, the customer may select a date range and a feeding schedule. The feeding schedule may include time ranges (e.g. late afternoon) and/or times of a day for feedings. In some embodiments, the customer may select additional services to be performed by the UAV such as capturing a video at the property that can be viewed by the customer.

In some embodiments, the customer enrolled in the program may be instructed to place a food dish in a non-obstructed area on the property that may be visible and accessible to a UAV. In some embodiments, the user may be prompted to stand over the dish and take a picture using a mobile application on a mobile device. The system may record the global positioning system (GPS) location of the food dish from metadata of the captured image. The customer may be given the choice to purchase a special food dish with colors/markings/barcodes that a UAV could use to locate the food drop-off spot. In some embodiments, the food dish may be configured to be secured to the ground. In some embodiments, if the customer chooses to have a food dish delivered by the service, the system may prompt the customer to take a picture of the drop-off location to capture the GPS coordinate of the location. At the time of the delivery, the food dish may be lowered with an aerial crane along with the animal food. The aerial crane may be configured to automatically detached from the dish when the dish touches the ground and then filled the dish with animal food. In some embodiments, animal food may be transferred in a food container carried by the UAV. The food container may comprise a self-opening valve which may open when the container makes contact with the ground, a customer placed food dish, and/or a newly delivered food dish. In some embodiments, if multiple deliveries are scheduled for a UAV, the food container may include multiple chambers to provide food to multiple animals on a single delivery run.

In some embodiments, a system may instruct a UAV to travel to a delivery location hover at a set GPS coordinate and/or altitude (e.g. 10-15 feet) from the ground. A bottom-facing camera of the UAV may be used to locate a customer placed food dish or the dish drop-off location designated by the customer. In some embodiments, the UAV may include an aerial crane for lowering the food container towards the ground. The cable to the aerial crane may include an "over the intended pressure" in-line breaker that allows the cable to break loose if the cable becomes hooked or tangled with something on the ground. In some embodiments, after the delivery is complete, the UAV may "loiter" around the property to film an aerial video for the customer to view.

In some embodiments, each time an animal is fed through with the aerial animal food delivery system, the system may send a notification to the customer. In some embodiments, the notification may include a link for the customer to view the aerial video taken during the feeding. In some embodiments, a video may be streamed to the customer in real-time while the UAV is at the customer premises. In some embodiments, the system may analyze the video taken by the UAV to ensure that the animal is present during a feeding. If no animal is found on the premises based on the video analysis, the system may notify the owner. In some embodiments, when an owner receives a missing animal notification, the owner may request a larger search area (e.g. using an interactive map or GPS coordinates) and the system may instruction another UAV to look for the animal in the search area.

Figure 1:
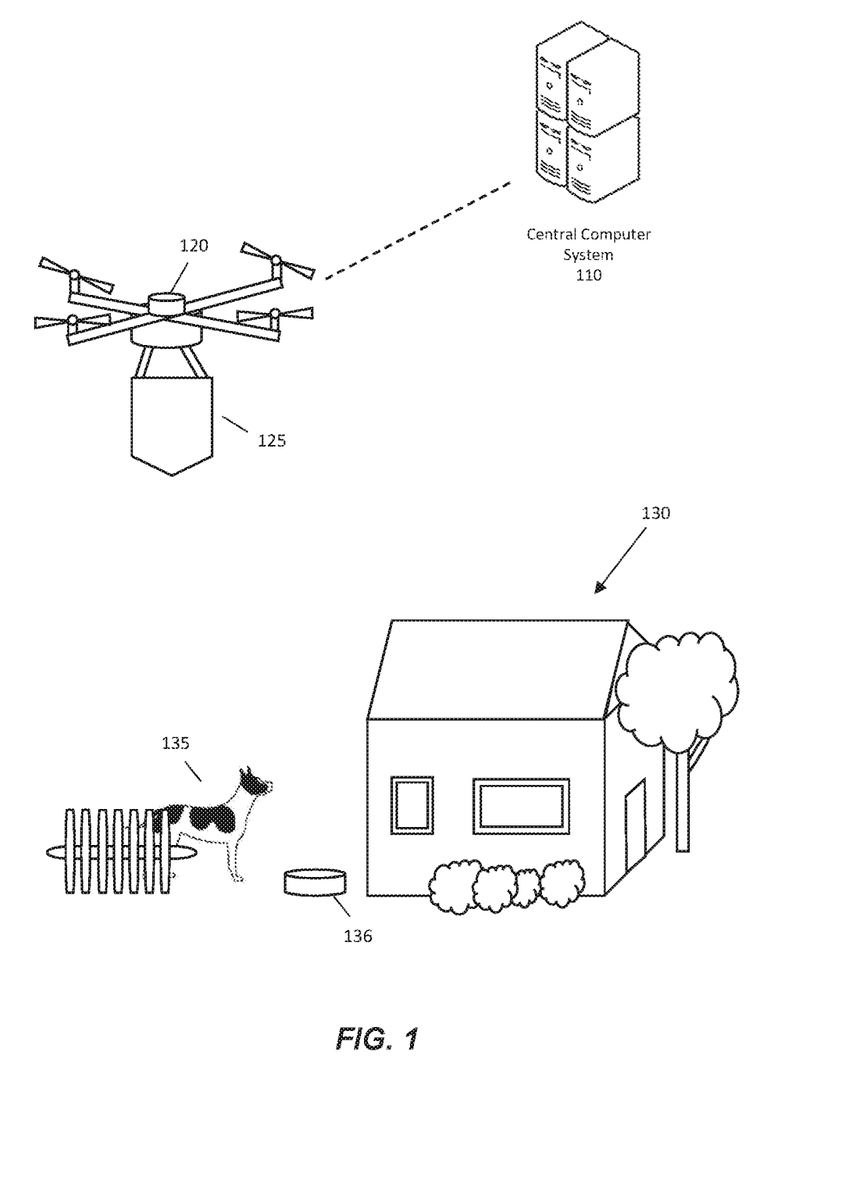
FIG. 1 is a system diagram in accordance with several embodiments.

Referring now to FIG. 1, a system for providing animal food delivery service is shown. The system includes a central computer system 110 configured to communicate with a UAV 120 carrying an animal food container 125 for holding animal food during transport. The UAV 120 may be configured to delivery animal food into a food receptacle 136 at a service location 130 to feed one or more animals 135.

The central computer system 110 may comprise a control circuit, a central processing unit, a processor, a microprocessor, and the like and may be one or more of a server, a central computing system, a retail computer system, a personal computer system, and the like. Generally, the central computer system 110 may be any processor-based device configured to communicate with UAVs based on aerial animal feeding service orders. The central computer system 110 may include a processor configured to execute computer readable instructions stored on a computer readable storage memory. The central computer system 110 may generally be configured to cause the UAV 120 to travel to the service location 130 with the animal food container 125 and release the food in an unpackaged form such that the animal food is accessible to and edible by one or more animals at the service location upon release. In some embodiments, the central computer system 110 may further be configured to instruct the UAV 120 to collect data at the service location 130 and provide notifications to the customer associated with the service location 130 based on the collected data. Generally, the central computer system 110 may perform one or more steps in the methods and processes described with reference to FIG. 2 herein. Further details of a central computer system 110 according to some embodiment are provided with reference to FIG. 3 herein.

The UAV 120 may generally comprise an unmanned aerial vehicle configured to carry the animal food container 125 in flight and fly near the service location 130 for delivery. In some embodiments, the UAV 120 may comprise a multicopter configured to hover at the service location 130. In some embodiments, the UAV may be a quadcopter, or hexacopter, octocopter, etc. In some embodiments, the UAV 120 may comprise a communication device configured to communicate with the central computer system 110 before and/or during flight, a GPS receiver configured to provide geolocation information of the UAV 120, and a control circuit configured to control the motors driving a plurality of propellers to steer the UAV 120. In some embodiments, the UAV 120 may include other flight sensors such as optical sensors and radars for detecting obstacles in the path of flight to avoid collisions. While only one UAV 120 is shown, in some embodiments, the central computer system 110 may communicate with and/or provide instructions to a plurality of UAVs. In some embodiments, two or more UAVs may be deployed to perform delivery to the service location 130 at the same time and/or in shifts.

The animal food container 125 may generally comprise a container configured to hold animal food during flight. In some embodiments, the animal food container 125 may be configured to release food in an unpackaged form such that the animal food is accessible to and edible by one or more animals upon release. In some embodiments, the animal food container 125 may comprise an attachment to the UAV 120 and/or may be part of a specialized UAV. In some embodiments, the animal food container 125 may be coupled to the UAV 120 via an aerial crane that is configured to lower the animal food container 125 relative the UAV 120 to release animal food. For example, the aerial crane may comprise an extendable cable attached to the animal food container 125. The animal food container 125 may comprise an opening for releasing its content into a food receptacle 136 (e.g. feeding dish) and/or to the ground to feed animals. In some embodiments, the opening comprises a self-opening valve that opens when the animal food container 125 contacts a food receptacle 136 and/or the ground. For example, the valve may be configured to be actuated by an upward pressure at the bottom of the animal food container 125. In some embodiments, the opening may comprise a powered opening controlled by the controls of the UAV 120 and/or a control circuit based on a local sensor and/or remote instructions. In some embodiments, the opening may be configured to release the entire content of the food container when actuated. In some embodiments, the opening may be powered closed by a control circuit or closed with the lifting of the animal food container 125 to control the amount of animal food that is released with each opening. In some embodiments, the animal food container 125 may comprise a plurality of compartments for delivering food to multiple locations and/or for delivering different types of foods in a single delivery trip.

In some embodiments, the UAV 120 may comprise one or more sensors for navigating and/or capturing data at the service location 130. The sensors may comprise one or more of an image sensor, a sound sensor, a light sensor, a visible spectrum camera, a thermal image sensor, a night vision camera, etc. In some embodiments, the UAV 120 may comprise a bottom-facing camera for locating the food receptacle 136 and/or a designated delivery location at the service location.

In some embodiments, the UAV 120 may be further configured to carry and deliver a food receptacle 136 to the service location 130. In some embodiments, the food receptacle 136 may be carried by the UAV 120 with or without an animal food container 125. In some embodiments. The food receptacle 136 may be attached to a UAV 120 with cables that releases the food receptacle 136 when the food receptacle 136 comes into contact with the ground. In some embodiments, a UAV 120 may transport both the food receptacle 136 and food in animal food container 125. The UAV 120 may be configured to first release the food receptacle 136 at the customer premise and then release food from the animal food container 125 into the food receptacle 136. In some embodiments, the food receptacle 136 and the animal food may be released sequentially as an aerial crane lowers the assembly towards the ground.

The service location 130 may generally be any location designated by customers as areas where animals are kept. In some embodiments, the service location 130 may comprise one or more of a backyard, side yard, front yard, farm, ranch, etc. While one residence residential premises is shown in FIG. 1, in some embodiments, the service location 130 may comprise other types of building structure and/or an open area such a farm or a ranch. In some embodiments, the service location 130 may comprise a fenced area for the keeping the animal(s) 136. In some embodiments, the customer may designate a food drop off location and/or define the area where the animal is expected to be kept via an interactive map and/or via GPS coordinates. In some embodiments, the customer may place a food receptacle 136 at the service location prior to a scheduled delivery. In some embodiments, the food receptacle 136 may be delivered by a UAV 120. In some embodiments, the food receptacle 136 may comprise one or more of a feeding dish, a feeding bowl, a feeding pad, a feeding trough, etc. In some embodiments, a user interface may be provided to the customer to identify the location of the food receptacle 136 and/or the drop off location. For example, a user interface may prompt the user to capture a photo and/or push a button over the food receptacle 136 and/or the drop-off location such that the system may use the current GPS coordinate of the user device as the coordinate of the food receptacle 136 and/or drop off location. In some embodiments, the food receptacle 136 may comprise an image, a pattern, etc. that may be used by the UAV 120 to optically locate the food receptacle 136.

Figure 2:
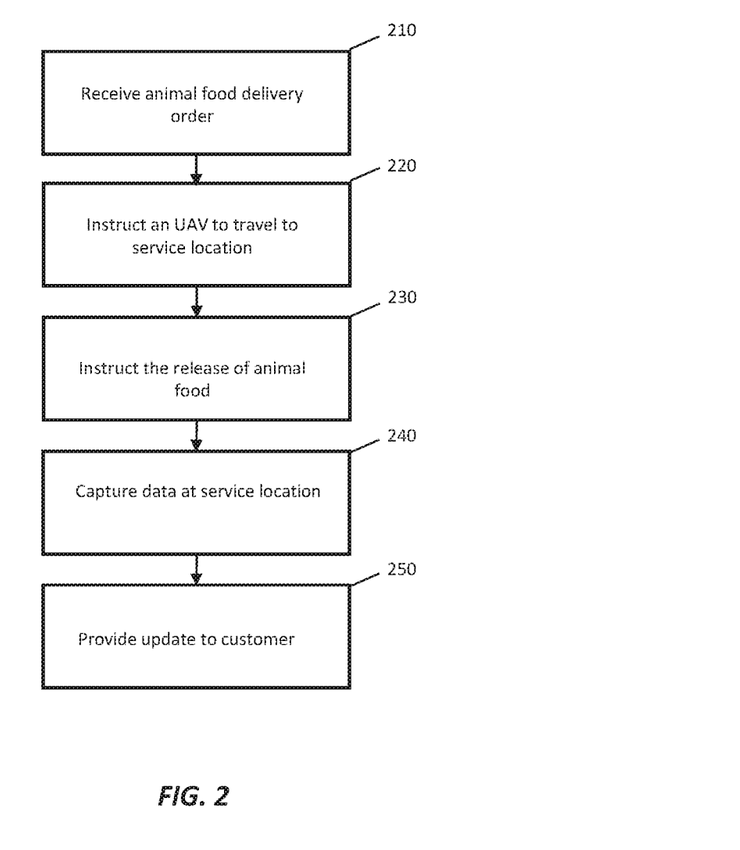
FIG. 2 is a flow diagram of a method in accordance with several embodiments.

Referring now to FIG. 2, a method of monitoring premises is shown. In some embodiments, the steps shown in FIG. 2 may be performed by a processor-based device, such as the central computer system 110 shown in FIG. 1, the control circuit 314, the control circuit 342, and/or the control circuit 321 described with reference to FIG. 3 below. In some embodiments, the steps may be performed by one or more of a processor at the central computer system, a processor of a user device, and a processor of a UAV.

In step 210, the system receives an animal food delivery order. In some embodiments, the system may provide a user interface for a user to enter and configure one or more animal food delivery orders. In some embodiments, the order may comprise a one-time or a reoccurring delivery order. In some embodiments, the order may comprise a feeding schedule that specifies the frequency and time frames for feeding (e.g. daily at late morning and late afternoon, 3 times a day, weekends only, etc.). In some embodiments, the order may comprise an animal food type selection (e.g. amount, type, brand, variety, etc.) and animal food portion selection (e.g. 1 cup, 6 ounces, etc.). In some embodiments, the order may specify animal information such as animal type (e.g. cat, dog, goat, fish, etc.), breed (e.g. Husky, bulldog, etc.), age, size, health status, etc. In some embodiments, the order may comprise a description of the service location and/or the animal area (e.g. backyard, front yard, ranch, etc.). In some embodiments, the user may specify an area that the animal is kept via an interactive map and/or via GPS coordinates for the order. In some embodiments, the order may comprise a food and/or food receptacle drop off location. In some embodiments, the system may prompt the user to take a picture or push an on-screen button of a user device over the food receptacle and/or the drop off location and use the GPS coordinate of the user device as the delivery spot. In some embodiments, the system may show an aerial map (e.g. satellite map) of the service location and prompt the user to select a delivery spot within the service location.

In step 220, the system instructs a UAV to travel to the service location at a service time with an animal food container. The service location and the service time may be based on the one or more animal food delivery orders received at step 210. The UAV may generally be configured to carry an animal food container in flight and travel to the service location for delivery. In some embodiments, the animal food container may be coupled to the UAV via an extendable crane. In some embodiments, the food container may comprise a plurality of compartments for storing different animal food type associated with multiple animals and/or animal feeding service orders. In some embodiments, the UAV may comprise a multicopter configured to hover at the service location during delivery. In some embodiments, the UAV may be a quadcopter, or hexacopter, octocopter, etc. In some embodiments, the UAV may comprise the UAV 120 described with reference to FIG. 1, the UAV 320 described with reference to FIG. 3, and/or the UAV 410 described with reference to FIG. 4 herein. In some embodiments, a central computer may determine a route from a dispatch location to the service location or the UAV to travel and communicate the route to the UAV. In some embodiments, the central computer system may maintain communication with the UAV to assist in the navigation as the UAV travels to the service location.

In step 230, the system instructs the UAV to release of the animal food from the animal food container. In some embodiments, the animal food is released an unpackaged form at the service location such that the animal food is accessible to and edible by one or more animals upon release. For example, the released animal food may comprise loose kibbles for cats or dogs. In some embodiments, the UAV may first locate a delivery spot which may comprise one or more of a food fish and a food drop off location. In some embodiments, the UAV may comprise a bottom-facing camera for optically locating a food receptacle. In some embodiments, the food receptacle may comprise an optically recognizable image (e.g. pattern, logo, etc.) and the UAV may identify the delivery spot based on locating the optically recognizable image at the service location. In some embodiments, the UAV may be configured to locate the food receptacle with a sensor and hover over the food receptacle to release the animal food. When the delivery spot is located within the service location, the UAV may lower the food container and cause the food to be released from the container. In some embodiments, the food may be lowered by the UAV lowering its flying altitude. In some embodiments, the UAV may comprise a crane having an extendable cable for lowering the food container relative to the UAV while the UAV maintains its hovering position. In some embodiments, the food container may comprise a bottom opening configured to remain closed during transport and open when the bottom of the food container contacts a firm surface such as a food receptacle or the ground. In some embodiments, a UAV may be configured to electrically and/or mechanically open and close the opening to cause the food container to release its content. In some embodiments, the food in the food container may be portioned out for the feeding prior to transport. In some embodiments, the UAV and/or a separate control circuit may be configured to time the closing of the food container opening to control the food portion released from the food container.

In some embodiments, a UAV may be further configured to transport a food receptacle to the customer location and place the food receptacle at the service location prior to releasing the animal food into the food receptacle. In some embodiments, the food receptacle may be secured to the UAV below the animal food container in flight. The food receptacle may be released when the food receptacle contacts the ground at the service location. The food container may then be configured to place its content into the released food container.

In step 240, the system captures data at the service location. In some embodiments, the UAV may detect for the presence of the animal at the service location via one or more of a camera, an optical sensor, a thermal sensor, a radio frequency identification (RFID) tag sensor, etc. In some embodiments, the UAV may also use sensors to capture data relating to other conditions of the service location (e.g. detect for broken windows, unattended packages, etc.). In some embodiments, step 240 may be performed before, during, and/or after step 230. In some embodiments, the UAV may remain at the service premise to ensure that the animal food is consumed by an animal prior to departure.

In step 250, the system provides an update to the customer. In some embodiments, the central system may be configured to provide an animal status notification to a user associated with the animal feeding service order based on data captured by the unmanned aerial vehicle at the service location in step 240. In some embodiments, the analysis of the captured data may be performed by the central computer system and/or the UAV. In some embodiments, the system may notify the customer that animal feed has been delivered and whether an animal is spotted at the service location. In some embodiments, the notification may be provided via a messaging service (e.g. email, text messages) and/or a user interface (e.g. web page, mobile application, etc.). In some embodiments, the UAV may capture videos at the service location and the central system may provide video images of the service location to the user associated with the animal feeding service order. In some embodiments, the system may notify the user (e.g. via email or pop-up notification) that a feeding is in progress. In some embodiments, the system may provide a real-time video feed to the customer during a feeding. In some embodiments, the system may provide limited control of the UAV to the customer via a user interface. For example, the system may allow the user to change the angle and zoom of a camera on the UAV during a feeding such that the user can inspect the service location and/or animals in the service location while the UAV is on premises. In some embodiments, if no animal presence is detected during a scheduled feeding, the system may notify the customer. The customer may request additional actions such as sending out a search UAV in an attempt to locate the animal. The search UAV may perform a more thorough search of the service location and/or perform a search in the neighborhood of the service location. The search UAV may comprise the delivery UAV or a different UAV.

In some embodiments, the UAV may further be configured to retrieve a used food receptacle. For example, the UAV may be configured to recognize a pattern of an emptied food receptacle (e.g. exposed bottom image) and attach itself to the food receptacle. The attachment means may comprise any convention attachment means such as a mechanical coupler and a magnetic coupler. The retrieve food dish may be brought back to a UAV dispatch facility for cleaning and refurbishment. In some embodiments, after step 250, the UAV may be instructed to return to the dispatch facility or perform another delivery at another service location.

Figure 3:
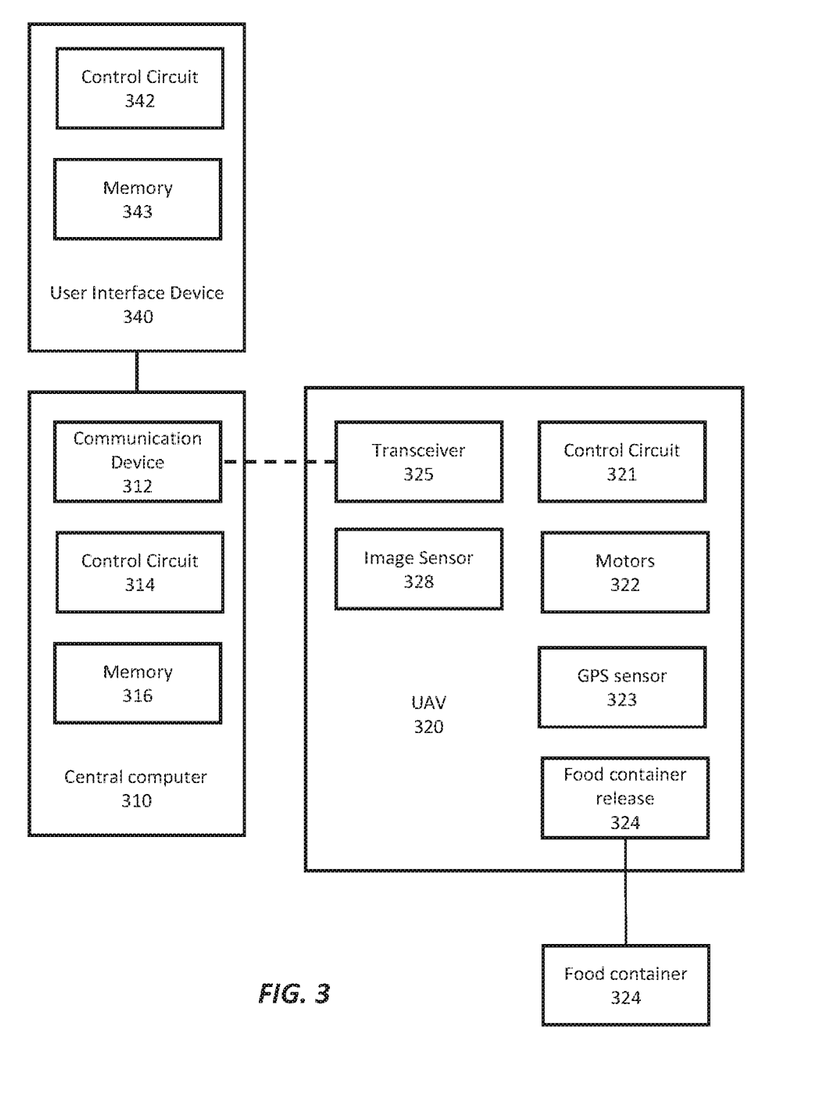
FIG. 3 is a block diagram of a system in accordance with several embodiments.

Referring now to FIG. 3, a block diagram of a system for providing aerial animal food delivery is shown. The system includes a central computer 310, a UAV 320 carrying a food container 329, and a user interface device 340.

The user interface device 340 comprises a control circuit 342 and a memory 343. The user interface device 340 may be one or more of a computer accessing a web site, a computer running a program, a mobile device running a mobile application, etc. The control circuit 342 may be configured to execute computer readable instructions stored on a memory 343. The computer readable storage memory 343 may comprise volatile and/or non-volatile memory and have stored upon it a set of computer readable instructions which, when executed by the control circuit 342, causes the control circuit 342 to provide a user interface to a user and exchange information with the central computer 310 via the user interface. The user interface device 340 may further comprise one or more user input/output devices such as a touchscreen, a display, a keyboard, etc. that allows a user to enter an animal food delivery service order and interact with the provided user interface. The user interface on the user interface device 340 may further allow the user to receive and view notifications generated by the central computer 310, view videos captured by the UAV 320, and/or partially control UAV(s) at a service location associated with the user. In some embodiments, the user interface device 340 may be owned and/or operated by a customer and/or a retail entity. The user interface device 340 may further include a network interface for communicating with the central computer 310 via a network such as the Internet.

The central computer 310 comprises a communication device 312, a control circuit 314, and a memory 316. The central computer 310 may be one or more of a server, a central computing system, a service provider computer system, and the like. In some embodiments, the central computer 310 may comprise the central computer system 110 in FIG. 1. In some embodiments, the central computer 310 may comprise a system of two or more processor-based devices. The control circuit 314 may comprise a processor, a microprocessor, and the like and may be configured to execute computer readable instructions stored on a computer readable storage memory 316, The computer readable storage memory 316 may comprise volatile and/or non-volatile memory and have stored upon it a set of computer readable instructions which, when executed by the control circuit 314, cause the system provide a user interface to the user interface device 340 and instruct the UAV to travel to a service location to deliver animal food based on orders received from user interface devices 340. Generally, the computer executable instructions may cause the control circuit 314 of the central computer 310 to perform one or more steps in the methods and processes described with reference to FIG. 2 herein.

The UAV 320 may comprise an unmanned aerial vehicle configured to carry the food container 329 and fly to a service location to perform delivery. In some embodiments, the UAV 320 may comprise a multicopter configured to hover at the monitored premises. For example, the UAV may be a quadcopter, or hexacopter, octocopter, etc. In some embodiments, the UAV 320 may comprise the UAV 120 in FIG. 1 and/or the UAV 410 of FIG. 4. The UAV 320 includes a control circuit 321, motors 322, a GPS sensor 323, a data transceiver 325, an image sensor 328, and a food container release 324.

The control circuit 321 of the UAV 320 may comprise one or more of a processor, a microprocessor, a microcontroller, and the like. The control circuit 321 may be communicatively coupled to one or more of the motors 322, the GPS sensor 323, the data transceiver 325, the image sensor 328, and the food container release 324. Generally, the control circuit 321 may be configured to navigate the UAV 320 based on instructions received from the central computer 310.

The motors 322 may be motors that control one or more of a speed and/or orientation of one or more propellers on the UAV 320. The motors 322 are configured to be controlled by the control circuit 321 to lift and steer the UAV 320 in designated directions. The GPS sensor 323 may be configured to provide a GPS coordinate to the control circuit 321 for navigation. In some embodiments, the UAV 320 may further include an altimeter for providing altitude information to the control circuit 321 for navigation. Generally, the UAV may use the GPS and the altimeter readings to stay on a predetermined route to and from a service location. In some embodiments, the UAV 320 may further include short-range navigation sensors for avoiding collisions with obstacles in the path of the travel.

The data transceiver 325 may comprise one or more of a mobile data network transceiver, a Wi-Fi transceiver, a satellite network transceiver, a WiMax transceiver, and the like. Generally, the data transceiver 325 may be configured to allow the control circuit 321 to communicate with the central computer 310 while the UAV 320 is in flight and/or at a service location. In some embodiments, the central computer 310 maintains communication with the UAV 320 as the UAV 320 travels to one or more service locations to perform delivery.

The image sensor 328 may comprise visible and/or invisible light spectrum image sensors. In some embodiments, the image sensor 328 may comprise a colored image camera and/or a thermal image sensor. In some embodiments, the image sensor 328 may comprise a bottom-facing sensor configured to locate a food respectable for delivering animal food. In some embodiments, the image sensor 328 may comprise a sensor configured to detect for the presence and/or movement of animals at the service location.

The food container release 324 may be configured to cause animal food to be released from the food container 329 at the service location. In some embodiments, the food container release 324 may comprise a crane for lowering the food container 329 to the ground at the service location to release animal food. In some embodiments, the food container release 324 may comprise an electrical and/or mechanical actuator for opening and/or closing a release valve on the food container 329.

While only one UAV 320 is shown, in some embodiments, the central computer 310 may communicate with and/or control a plurality of UAVs. In some embodiments, the UAV 320 may further include other flight sensors such as optical sensors and radars for detecting obstacles in the path of flight. In some embodiments, the image sensor 328 may also be used as navigation sensors.

Figure 4:
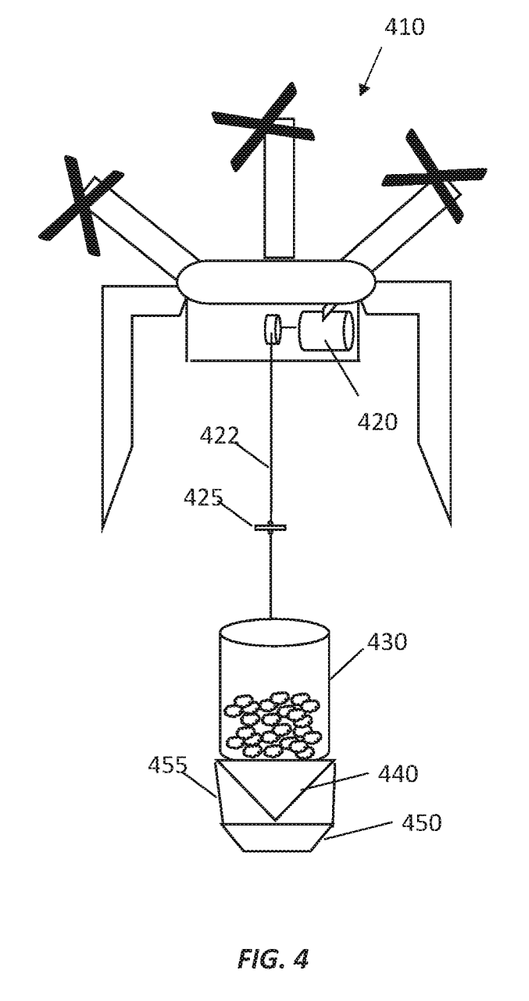
FIG. 4 is an illustration of an unmanned aerial vehicle in accordance with several embodiments.

Referring now to FIG. 4, an unmanned aerial vehicle in accordance with some embodiments is shown. The UAV 410 includes an aerial crane 420 coupled to a food container 430 via a cable 422. The food container 430 is further coupled to a food receptacle 450 via food receptacle cable 455.

The aerial crane 420 may be attached to the UAV 410 and configured to raise and lower the food container 430 and the food receptacle 450 by extending and retracting the cable 422. The cable 422 may comprise an in-line breaker 425 for allowing the food container 430 to separate from the UAV 410 if excessive force is applied to the cable. For example, if the food container 430 becomes caught in a bush or is held by an animal, the in-line breaker 425 may detach the food container 430 from the UAV 410 to prevent further damages to the UAV 410, the animal, and/or the premises property.

The food container 430 may include a bottom portion 440 that is configured to open and release the content of the food container 430. In some embodiments, the bottom portion 440 may comprise a self-opening valve that opens when the bottom portion 440 contacts a food receptacle and/or a firm surface. In some embodiments, the bottom portion may comprise a powered opening configured to be opened and closed by a control circuit.

The food receptacle 450 may comprise a receptacle configured to make animal food available for animal access and consumption. In some embodiments, the food receptacle may comprise a feeding bowl, a feeding dish, a feeding pad, a feeding trough, etc. The food receptacle cable 455 may be coupled to the food container 430, the cable 422 of the aerial crane 420, and/or the UAV 410. The food receptacle cable 455 may be configured to detach from the food receptacle 450 via a release mechanism. In some embodiments, the release mechanism may be actuated by an upward motion of the food receptacle 450 such as the motion caused by the bottom of the food receptacle 450 contacting a firm surface (e.g. ground). In some embodiments, the release mechanism may be mechanically and/or electrically activated by a control circuit.

When the UAV 410 arrives at a service location and identifies a delivery spot, the UAV 410 may first hover at a set altitude (e.g. 10-15 feet from the ground). In some embodiments, the UAV 410 may then cause the aerial crane 420 to extend the cable 422. With the lowering of the cable 422, the food receptacle 450 may first contact the ground and cause the food receptacle cable 455 to detach from the food receptacle 450. The cable 422 may then continue to lower the food container 430 into the detached food receptacle 450 to cause the bottom portion 440 of the food container 430 to open and release animal food into the food receptacle 450. The UAV 410 may then cause the aerial crane 420 to retract the cable to rise the food container 430 away from the detached food receptacle 450 and the released animal food. At the completion of the delivery, the UAV 410 may return back to the dispatch facility with only the food container 430 attached to the cable 422 of the aerial crane.

In one embodiment, a system for providing aerial animal food delivery, comprises: an unmanned aerial vehicle, an animal food container coupled to the unmanned aerial vehicle, the animal food container being configured to hold animal food during transport by the unmanned aerial vehicle, and a central computer system communicatively coupled to the unmanned aerial vehicle, the central computer system being configured to: instruct the unmanned aerial vehicle to travel to a service location at a service time with the animal food container and instruct a release of the animal food from the animal food container in an unpackaged form at the service location such that the animal food is accessible to and edible by one or more animals upon release.

In one embodiment, a method for providing aerial animal food delivery comprises: instructing, with a control circuit, an unmanned aerial vehicle to travel to a service location at a service time with an animal food container, the animal food container being configured to hold animal food during transport by the unmanned aerial vehicle; and instructing a release of the animal food from the animal food container in an unpackaged form at the service location such that the animal food is accessible to and edible by one or more animals upon release.

In one embodiment, an apparatus for providing aerial animal food delivery comprises: an unmanned aerial vehicle configured to travel to a service location based on instructions received from a central computer system; and an animal food container coupled to the unmanned aerial vehicle, the animal food container being configured to hold animal food during transport by the unmanned aerial vehicle; wherein, in response to instructions received from a central computer system, the unmanned aerial vehicle is further configured to cause the animal food container to release the animal food in an unpackaged form at the service location such that the animal food is accessible to and edible by one or more animals upon release.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system for providing aerial animal food delivery, comprising:
    an unmanned aerial vehicle;
    an animal food container coupled to the unmanned aerial vehicle, the animal food container being configured to hold animal food during transport by the unmanned aerial vehicle; and
    a central computer system communicatively coupled to the unmanned aerial vehicle, the central computer system being configured to:
    instruct the unmanned aerial vehicle to travel to a service location at a service time with the animal food container based on an animal feeding service order; and
    instruct a release of the animal food from the animal food container in an unpackaged form at the service location such that the animal food is accessible to and edible by one or more animals upon release;
    wherein the animal food is released into a food receptacle that is accessible by the one or more animals at the service location; and
    wherein the unmanned aerial vehicle further transports the food receptacle to the service location and is configured to release the food receptacle at the service location prior to releasing the animal food into the food receptacle.

2. The system of claim 1, wherein the unmanned aerial vehicle is configured to locate the food receptacle with a sensor and hover over the food receptacle to release the animal food.

3. The system of claim 1, wherein the animal food container is coupled to the unmanned aerial vehicle via an extendable crane.

4. The system of claim 1, wherein the animal food container comprises a bottom opening configured to remain closed during transport and open when a bottom of the food container contacts a firm surface.

5. The system of claim 1, wherein the animal food container comprises a plurality of compartments for storing different animal food types associated with multiple animals or animal feeding service orders.

6. The system of claim 1, wherein the central computer system is further configured to: provide an animal status notification to a user associated with the animal feeding service order based on data captured by the unmanned aerial vehicle at the service location.

7. The system of claim 1, wherein the central computer system is further configured to: provide video images of the service location captured by the unmanned aerial vehicle to a user associated with the animal feeding service order.

8. The system of claim 1, wherein the animal food is select from a plurality of animal food types based on the animal feeding service order.

9. A method for providing aerial animal food delivery, comprising:
    instructing, with a control circuit, an unmanned aerial vehicle to travel to a service location at a service time with an animal food container based on an animal feeding service order, the animal food container being configured to hold animal food during transport by the unmanned aerial vehicle; and
    instructing a release of the animal food from the animal food container in an unpackaged form at the service location such that the animal food is accessible to and edible by one or more animals upon release;
    wherein the animal food is released into a food receptacle at the service location; and
    wherein the unmanned aerial vehicle further transports the food receptacle to the service location and is configured to release the food receptacle at the service location prior to releasing the animal food into the food receptacle.

10. The method of claim 9, wherein the unmanned aerial vehicle is configured to locate the food receptacle with a sensor and hover over the food receptacle to release the animal food.

11. The method of claim 9, wherein the animal food container is coupled to the unmanned aerial vehicle via an extendable crane.

12. The method of claim 9, wherein the animal food container comprises a bottom opening configured to remain closed during transport and open when a bottom of the food container contacts a firm surface.

13. The method of claim 9, wherein the animal food container comprises a plurality of compartments for storing different animal food type associated with multiple animals or animal feeding service orders.

14. The method of claim 9, further comprising:
    providing an animal status notification to a user associated with the animal feeding service order based on data captured by the unmanned aerial vehicle at the service location.

15. The method of claim 9, further comprising:
    providing video images of the service location captured by the unmanned aerial vehicle to a user associated with the animal feeding service order via a user interface.

16. The method of claim 9, wherein the animal food is select from a plurality of animal food types based on the animal feeding service order.

17. An apparatus for providing aerial animal food delivery, comprising:
    an unmanned aerial vehicle configured to travel to a service location based on instructions received from a central computer system; and
    an animal food container coupled to the unmanned aerial vehicle, the animal food container being configured to hold animal food during transport by the unmanned aerial vehicle;
    wherein, in response to instructions received from the central computer system, the unmanned aerial vehicle is further configured to cause the animal food container to release the animal food in an unpackaged form at the service location such that the animal food is accessible to and edible by one or more animals upon release;
    wherein the animal food is released into a food receptacle at the service location; and
    wherein the unmanned aerial vehicle further transports the food receptacle to the service location and is configured to release the food receptacle at the service location prior to releasing the animal food into the food receptacle.

* * * * *